July 22, 1969   E. J. MAZURKIEWICZ   3,457,548
VEHICLE SEAT POSITIONING AID
Filed May 3, 1967
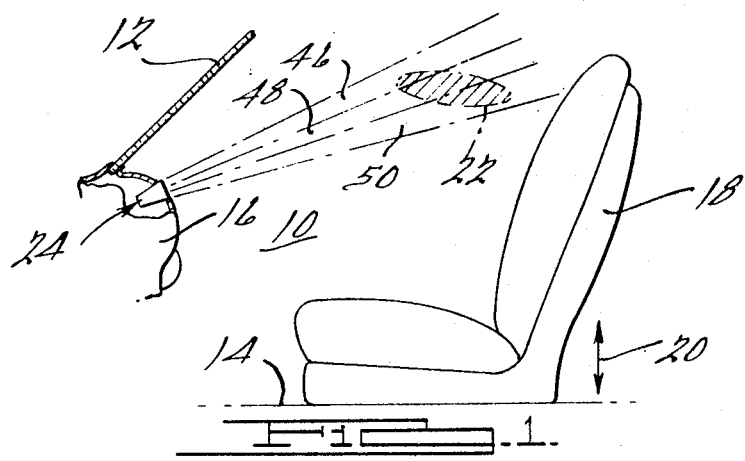
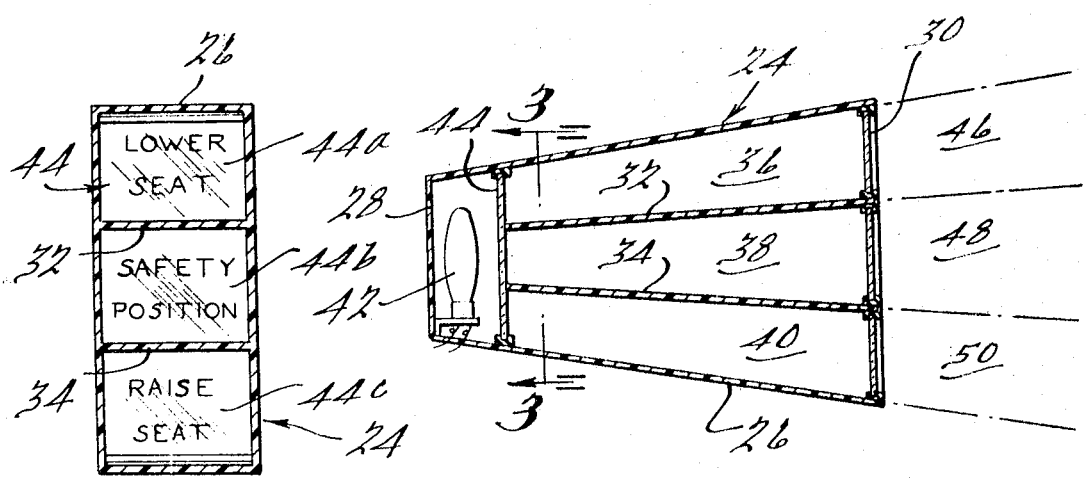
INVENTOR.
Edward J. Mazurkiewicz.
BY John R. Faulkner
E. Dennis O'Connor
ATTORNEYS.

United States Patent Office 3,457,548
Patented July 22, 1969

3,457,548
VEHICLE SEAT POSITIONING AID
Edward J. Mazurkiewicz, Dearborn Heights, Mich., assignor to Ford Motor Company, Dearborn, Mich., a corporation of Delaware
Filed May 3, 1967, Ser. No. 635,714
Int. Cl. B60n 1/02; A47c 31/00; G08b 5/00
U.S. Cl. 340—103                                     11 Claims

ABSTRACT OF THE DISCLOSURE

A seat positioning aid for use in a vehicle having a vertically adjustable passenger seat. A changing sign is mounted in the vehicle dash panel and bears three seat positioning instruction legends. Each of the legends may be observed from only one of three passenger compartment zones. The three zones are vertically aligned and the intermediate of the zones includes the optimum passenger eye position area.

Background of the invention

For reasons of aerodynamics, vehicle stability and styling, it is anticipated that the current trend towards passenger vehicles of reduced height will continue. Vehicle height may be defined as the sum of the dimensions from ground to occupant heel, occupant heel to stop of head, and head to top of roof surface. The first and last of these dimensions may be reduced only to set limits because of ground clearance and head room considerations, respectively. Continued reduction of overall vehicle height thus will necessitate a reduction of the occupant heel to top of head dimension that may be accomplished by seating the vehicle passenger in a more reclined position.

Consideration is being given to future vehicle designs utilizing horizontally stationary passenger seats and movable steering and floor controls. Seats in such vehicles will be adjustable vertically. Passenger eye position in such a vehicle is critical in that sufficient visibility for safe vehicle operation and ability to observe instruments necessitates an eye position restricted to a particular zone of the passenger compartment. It has been established empirically that due to human population stature variations, ninety percent of the population will position an adjustable seat so that the locus of eye positions defines a spheroid 4.5 inches high and 9.2 inches long. Only a portion of this spheroid, however, includes the acceptable eye position zone for future vehicles having a reclined seating position as described above.

This invention provides a vehicle seat positioning aid mounted in the dash panel and including a changing sign observable by a vehicle passenger and giving seat positioning instructions so that optimum eye position may be achieved in a vehicle having a reclined seating position and vertically adjustable seat.

Summary of the invention

A vehicle seat positioning aid constructed in accordance with this invention is adapted for utilization in a motor vehicle having body structure defining a passenger compartment, a vertically adjustable forward facing seat mounted within said compartment and an optimum eye position area for a passenger seated on the seat. The seat positioning aid includes changing sign means mounted on the body structure forward of the seat and bearing three seat positioning instruction legends, each one of said legends being visible from one and only one of three vertically aligned zones within the compartment. The intermediate of these vertically aligned zones includes the optimum eye position area.

Description of the drawing

FIGURE 1 is a side elevation view of a portion of a vehicle passenger compartment including a schematic illustration of a vehicle seat positioning aid according to this invention;

FIGURE 2 is a sectional elevation view of a seat positioning aid adapted for utilization in the vehicle of FIGURE 1; and FIGURE 3 is a sectional view taken along the line 3—3 of FIGURE 2.

Detailed description of the invention

Referring now in detail to the drawing and in particular to FIGURE 1, the numeral 10 denotes the passenger compartment of a motor vehicle having a windshield 12, passenger compartment floor 14 and instrument or dash panel 16. A seat 18, vertically adjustable as indicated by arrows 20, is mounted on floor 14. The locus of eye positions for vehicle passengers included in ninety percent of the human population is illustrated by a spheroid 22. A seat positioning aid 24 is mounted on panel 16 so as to be observable by a passenger from seat 18.

As may be seen from FIGURES 2 and 3, the seat positioning aid 24 comprises a changing sign and includes a tapered housing 26 having a rectangular cross section. A housing end wall 28, remote from seat 18 is formed from opaque material while a housing end wall 30, proximate seat 18, is formed from transparent material such as glass. A pair of opaque partitions 32 and 34 are mounted at an angle to one another within housing 26, extend along a portion of length of the housing and cooperate with the housing to define tapered passageways 36, 38, and 40.

A light source or bulb 42 is mounted within housing 26 proximate housing end wall 28. A panel 44 is mounted within housing 26 between bulb 42 and the ends of partitions 32 and 34. Panel 44 includes three transparent portions 44a, 44b, and 44c that register with passageways 36, 38 and 40, respectively. Each of these portions of panel 44 bears a seat positioning legend as illustrated in FIGURE 3.

It readily may be appreciated that light from bulb 42 passes through transparent portion 44a of panel 44, housing passageway 36 and into a zone 46 of passenger compartment 10. The image of the legend imprinted on panel portion 44a thus is projected into zone 46 and is observable by a passenger having his eye position within zone 46. Similarly, the image of the legends imprinted on panel portions 44b and 44c is projected into compartment zones 48 and 50, respectively. Because the construction of seating aid 24 includes partitions 32 and 34, each of the legends is visible from one and only one of the compartment zones 46, 48 and 50.

Zone 48 includes the optimum passenger eye position area for desired visible extension of the vehicle and for observation of the complement of vehicle instruments. In the vehicle illustrated, this area consists of the space defined by the locus of points common to spheroid 22 and zone 48. If the eye position of a passenger seated on seat 18 is within this desired area, the legend "Safety Position" or an equivalent instruction may be observed and the passenger is made aware that no seat adjustment is necessary. If, however, the eye position of the passenger is above or below zone 48 (within zones 46 or 50), the instruction legends "Lower Seat" or "Raise Seat" may be observed and the appropriate seat adjustment made.

This invention thus provides a seat positioning air for a motor vehicle including changing sign means observable by a passenger seated on an adjustable seat, said sign means including a seat positioning instruction legends so that the passenger may adjust the seat to obtain the optimum eye position.

It is to be understood that this invention is not limited to the exact construction illustrated and described above, but that various changes and modifications may be made, such as the utilization of a changing sign having a lens systems and/or angularly canted louvers, without departing from the spirit and scope of the invention as defined by the following claims.

I claim:

1. In a motor vehicle body structure defining a passenger compartment, a vertically adjustable forward facing passenger seat mounted within said compartment, a portion of said compartment comprising an optimum eye position area for a passenger seated on said seat, and image projecting means mounted on said body structure forward of said seat and projecting a plurality of seat positioning instruction legends into mutually exclusive, vertically aligned zones of said compartment, one of said zones including said optimum eye position area, said seat being capable of vertical adjustment such that the eyes of a passenger may be positioned in any of said zones.

2. The combination of claim 1, wherein said zones are substantially contiguous.

3. The combination of claim 2, wherein there are three zones and three projected legends, the intermediate of said zones including said optimum eye position area.

4. In a motor vehicle, body structure defining a passenger compartment, a vertically adjustable forward facing passenger seat mounted within said compartment, a portion of said compartment comprising an optimum eye position area for a passenger seated on said seat, and changing sign means mounted on said body structure forward of said seat and bearing a plurality of vertically aligned seat positioning instruction legends, each one of said legends being visible from one and only one of a plurality of vertically aligned zones of said compartments, said seat being capable of vertical adjustment such that the eyes of a passenger may be positioned in any of said zones.

5. The combination of claim 4, wherein said zones are substantially contiguous.

6. The combination of claim 5, wherein there are three legends and three zones, the intermediate of said zones including said optimum eye position area, the legend visible from said zone indicating said seat is correctly positioned, the legend visible from the highest zone indicating said seat should be lowered, and the legend visible from the lowest zone indicating said seat should be raised.

7. In a motor vehicle having body structure defining a passenger compartment and a vertically adjustable passenger seat mounted within said compartment, an optical seat positioning aid mounted by said structure forward of said seat, said seat positioning aid including a source of light, a panel having a plurality of transparent portions operatively secured to said structure between said light source and said seat, a seat positioning instruction legend on each of said portions, and means projecting the light from said source passing through each of said portions towards said seat in a plurality of vertically aligned mutually exclusive zones, said seat being capable of vertical adjustment such that the eyes of a passenger may be positioned in any of said zones.

8. The combination of claim 7, wherein said zones are substantially contiguous.

9. The combination of claim 8, wherein there are three panel portions and three light projecting zones, the intermediate of said zones including the optimum passenger eye position area.

10. The combination of claim 7, wherein said means includes a housing having a plurality of elongate open ended passageways having opaque side walls formed therein, said light source positioned at one end of said passageways, one of said panel portions in registry with each of said passageways.

11. The combination of claim 10, wherein said side walls diverge as the distance from said light source increases.

References Cited

UNITED STATES PATENTS

| | | | |
|---|---|---|---|
| 2,539,654 | 1/1951 | Barnes | 40—137 |
| 2,866,664 | 12/1958 | Parsons | 296—65 |
| 3,293,348 | 12/1966 | Blackadder et al. | 35—10.2 |

FOREIGN PATENTS

| | | |
|---|---|---|
| 413,590 | 5/1910 | France. |

EUGENE R. CAPOZIO, Primary Examiner

RICHARD CARTER, Assistant Examiner

U.S. Cl. X.R.

40—132; 244—1; 297—217; 340—378